United States Patent
Lavoie (10) Patent No.: US 10,328,933 B2
(45) Date of Patent: Jun. 25, 2019

(54) COGNITIVE REVERSE SPEED LIMITING

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 14/926,581

(22) Filed: Oct. 29, 2015

(65) Prior Publication Data

US 2017/0120903 A1    May 4, 2017

(51) Int. Cl.
| | |
|---|---|
| *B60T 7/22* | (2006.01) |
| *B60W 30/09* | (2012.01) |
| *B60W 30/06* | (2006.01) |
| *B60W 30/095* | (2012.01) |
| *B60W 30/18* | (2012.01) |

(52) U.S. Cl.
CPC .............. *B60W 30/09* (2013.01); *B60T 7/22* (2013.01); *B60W 30/06* (2013.01); *B60W 30/095* (2013.01); *B60W 30/0953* (2013.01); *B60W 30/18036* (2013.01); *B60T 2201/022* (2013.01); *B60T 2201/10* (2013.01); *B60T 2230/08* (2013.01); *B60W 2300/14* (2013.01); *B60W 2420/54* (2013.01); *B60W 2540/22* (2013.01); *B60W 2550/10* (2013.01)

(58) Field of Classification Search
CPC .................................. B60W 30/09; B60T 7/22
USPC ................ 701/18, 41, 532, 70, 23; 180/168
See application file for complete search history.

(56) References Cited

U.S. PATENT DOCUMENTS

| | | |
|---|---|---|
| 5,919,241 A | 7/1999 | Bolourchi et al. |
| 6,122,579 A | 6/2000 | Collier-Hallman et al. |
| 6,370,459 B1 | 4/2002 | Phillips |
| 6,424,895 B1 | 7/2002 | Shimizu et al. |
| 6,539,288 B2 | 3/2003 | Ishida et al. |
| 6,580,984 B2 | 6/2003 | Fecher et al. |
| 6,604,592 B2 | 8/2003 | Pietsch et al. |
| 6,631,781 B2 | 10/2003 | Williams et al. |
| 7,039,504 B2 | 5/2006 | Tanaka et al. |

(Continued)

FOREIGN PATENT DOCUMENTS

| | | |
|---|---|---|
| CN | 202541524 | 11/2012 |
| DE | 102005043466 A1 | 3/2007 |

(Continued)

OTHER PUBLICATIONS

SH.Azadi et al., Automatic Parking of an Articulated Vehicle Using ANFIS, Global Journal of Science, Engineering end Technology, GJSET Publishing, 2013, Issue 14, 2013, pp. 93-104.

(Continued)

*Primary Examiner* — Thomas G Black
*Assistant Examiner* — Luat T Huynh
(74) *Attorney, Agent, or Firm* — Raymond Coppiellie; Price Heneveld LLP (57) ABSTRACT

A parking assist system for a vehicle is provided that includes a speed limiting controller configured to set a speed limit for the vehicle during a maneuver and an audio sensor configured to sense an ambient sound within the vehicle. The speed limiting controller is configured to reduce the speed limit based on the sensing of the ambient sound within the vehicle.

20 Claims, 4 Drawing Sheets

(56) References Cited

U.S. PATENT DOCUMENTS

| | | | |
|---|---|---|---|
| 7,546,191 B2 | 6/2009 | Lin et al. | |
| 7,706,944 B2 | 4/2010 | Tanaka et al. | |
| 7,777,615 B2 | 8/2010 | Okuda et al. | |
| 7,813,855 B2 | 10/2010 | Watanabe et al. | |
| 7,904,222 B2 | 3/2011 | Lee et al. | |
| 8,020,657 B2 | 9/2011 | Allard et al. | |
| 8,139,109 B2 | 3/2012 | Schmiedel et al. | |
| 8,169,341 B2 | 5/2012 | Toledo et al. | |
| 8,319,614 B2 | 11/2012 | Takano | |
| 8,374,749 B2 | 2/2013 | Tanaka | |
| 8,406,956 B2 | 3/2013 | Wey et al. | |
| 8,427,288 B2 | 4/2013 | Schofield et al. | |
| 8,464,829 B2 | 6/2013 | Von Tardy-Tuch et al. | |
| 8,498,770 B2 | 7/2013 | Takano | |
| 8,521,364 B2 | 8/2013 | Hueger et al. | |
| 8,571,758 B2 | 10/2013 | Klier et al. | |
| 8,626,382 B2 | 1/2014 | Obradovich | |
| 8,645,015 B2 | 2/2014 | Oetiker et al. | |
| 8,755,984 B2 | 6/2014 | Rupp et al. | |
| 8,798,860 B2 | 8/2014 | Dechamp | |
| 8,823,796 B2 | 9/2014 | Shen et al. | |
| 8,825,221 B2 | 9/2014 | Hueger et al. | |
| 8,888,120 B2 | 11/2014 | Trevino | |
| 8,909,426 B2 | 12/2014 | Rhode et al. | |
| 8,948,990 B2 * | 2/2015 | Kobayashi | B62D 15/0285 340/932.2 |
| 9,008,890 B1 * | 4/2015 | Herbach | B60W 30/00 340/435 |
| 9,043,083 B2 | 5/2015 | Kadowaki et al. | |
| 9,102,271 B2 | 8/2015 | Trombley et al. | |
| 9,132,856 B2 | 9/2015 | Shepard | |
| 9,174,672 B2 | 11/2015 | Zeng et al. | |
| 9,208,686 B2 | 12/2015 | Takamatsu | |
| 9,229,453 B1 | 1/2016 | Lee | |
| 9,238,483 B2 | 1/2016 | Hafner et al. | |
| 9,248,858 B2 | 2/2016 | Lavoie et al. | |
| 9,305,463 B1 * | 4/2016 | Yellambalase | H04N 21/42203 |
| 9,400,897 B2 | 7/2016 | Bruening et al. | |
| 9,429,943 B2 | 8/2016 | Wilson et al. | |
| 9,464,913 B2 | 10/2016 | Brown et al. | |
| 9,520,063 B2 | 12/2016 | Noh | |
| 9,676,377 B2 * | 6/2017 | Hafner | B60T 8/1708 |
| 9,836,060 B2 | 12/2017 | Ghneim et al. | |
| 9,840,278 B2 | 12/2017 | Lavoie et al. | |
| 2005/0206225 A1 | 9/2005 | Offerle et al. | |
| 2006/0190147 A1 | 8/2006 | Lee et al. | |
| 2006/0244579 A1 | 11/2006 | Raab | |
| 2007/0057816 A1 | 3/2007 | Sakakibara et al. | |
| 2007/0158128 A1 * | 7/2007 | Gratz | B60R 25/1004 180/287 |
| 2008/0086269 A1 * | 4/2008 | Joe | B60W 30/09 701/301 |
| 2009/0079828 A1 * | 3/2009 | Lee | B60R 1/00 348/148 |
| 2009/0222202 A1 | 9/2009 | Kato | |
| 2012/0224059 A1 | 9/2012 | Takamatsu | |
| 2012/0271522 A1 | 10/2012 | Rupp et al. | |
| 2012/0283909 A1 | 11/2012 | Dix | |
| 2012/0316732 A1 | 12/2012 | Auer | |
| 2013/0006472 A1 | 1/2013 | McClain et al. | |
| 2013/0103246 A1 | 4/2013 | Staack | |
| 2013/0120161 A1 | 5/2013 | Wakabayashi et al. | |
| 2013/0229524 A1 | 9/2013 | Vovkushevsky et al. | |
| 2013/0238193 A1 | 9/2013 | Bolourchi et al. | |
| 2014/0121883 A1 | 5/2014 | Shen et al. | |
| 2014/0121930 A1 | 5/2014 | Allexi et al. | |
| 2014/0188344 A1 | 7/2014 | Lavoie | |
| 2014/0244095 A1 | 8/2014 | Choi et al. | |
| 2014/0267727 A1 | 9/2014 | Alaniz | |
| 2015/0012202 A1 | 1/2015 | Moore et al. | |
| 2015/0025732 A1 | 1/2015 | Min et al. | |
| 2015/0077557 A1 | 3/2015 | Han et al. | |
| 2015/0158524 A1 | 6/2015 | Lee et al. | |
| 2015/0191200 A1 | 7/2015 | Tsubaki et al. | |
| 2015/0217692 A1 | 8/2015 | Yanagawa | |
| 2015/0232092 A1 | 8/2015 | Fairgrieve et al. | |
| 2015/0251602 A1 | 9/2015 | Baur et al. | |
| 2015/0274202 A1 | 10/2015 | Tsunoda et al. | |
| 2015/0369613 A1 | 12/2015 | Stadler | |
| 2016/0103499 A1 * | 4/2016 | Yamamoto | G06F 3/017 345/156 |
| 2016/0207526 A1 | 7/2016 | Franz et al. | |
| 2016/0229452 A1 | 8/2016 | Lavoie et al. | |
| 2016/0301698 A1 * | 10/2016 | Katara | G07B 13/02 |
| 2016/0304088 A1 | 10/2016 | Barth | |
| 2016/0304122 A1 | 10/2016 | Herzog et al. | |
| 2016/0320477 A1 | 11/2016 | Heimberger | |

FOREIGN PATENT DOCUMENTS

| | | |
|---|---|---|
| EP | 0842841 B1 | 5/2002 |
| EP | 1006042 B1 | 4/2006 |
| EP | 1695888 A2 | 8/2006 |
| EP | 2213546 A1 | 8/2010 |
| GB | 2496298 A | 5/2013 |
| JP | 649063 A | 1/1989 |
| JP | 2002337717 A | 11/2002 |
| JP | 2003261053 A | 9/2003 |
| JP | 2009113512 A | 5/2009 |
| JP | 201434289 A | 2/2014 |
| KR | 20060133750 | 12/2006 |
| KR | 20110114897 A | 4/2010 |
| KR | 1020140004411 A | 1/2014 |
| KR | 1020150038776 A | 4/2015 |
| WO | 2014092611 A1 | 6/2014 |

OTHER PUBLICATIONS

Cuesta et al., Intelligent System for Parallel Parking of Cars and Tractor-Trailers, Intelligent Mobile Robot Navigation, STAR 16, Springer-Verlag Berlin Heidelberg 2006, pp. 159-188.

* cited by examiner

COGNITIVE REVERSE SPEED LIMITING

FIELD OF THE INVENTION

The present disclosure generally relates to reverse and parking assist systems, and more specifically, to parking assist systems which account for the cognitive load of a driver of a vehicle.

BACKGROUND OF THE INVENTION

When reversing a vehicle, both the cognitive load on a driver and the collision risk may vary for a number of reasons. For example, when backing a vehicle and/or trailer into a parking space, the driver may need to monitor front corners of the vehicle in addition to the sides and rear of the vehicle to assure there is enough clearance between the vehicle and surrounding objects. In addition, the surrounding objects may also be moving, such as when a bicycle crosses the projected path of the vehicle. The cognitive load of the driver generally increases with vehicle speed due to the heightened situational awareness needed by the driver in order to operate the vehicle at that speed. While there may be perimeter sensing and collision mitigation features in place to warn the driver and stop the vehicle, it may be desirable to limit the speed of the vehicle to help manage the cognitive load of the driver and provide more comfortable collision mitigation when there are distracting conditions that may be competing for the driver's attention. Furthermore, managing the vehicle speed based on sensor activity can help limit the risk of a collision even with an automated driving system in place.

SUMMARY OF THE INVENTION

According to one aspect of the present invention, a parking assist system for a vehicle is provided that includes a speed limiting controller configured to set a speed limit for the vehicle during a maneuver; and an audio sensor configured to sense an ambient sound within the vehicle. The speed limiting controller is configured to reduce the speed limit based on the sensing of the ambient sound within the vehicle.

According to another aspect of the present invention, a method for assisting in parking a vehicle is provided that includes the steps of detecting a first distance to a first obstacle using one or more sensors; detecting an ambient sound volume using an audio sensor; detecting environmental conditions external to the vehicle using an environmental sensor; and generating a brake torque request using a speed limiting controller configured to slow the vehicle. The brake torque request is based on the detection of at least one of the first distance to the first obstacle, the ambient sound volume, and the environmental conditions.

According to a further aspect of the present invention, a parking assist system for a vehicle is provided that includes one or more proximity sensors. An audio sensor is configured to sense an ambient sound volume within the vehicle. An environmental sensor is configured to detect environmental conditions. A speed limiting controller is configured to generate a speed limit for the vehicle during a parking maneuver. The controller is configured to reduce the speed limit based on data from the proximity sensors and the audio sensor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
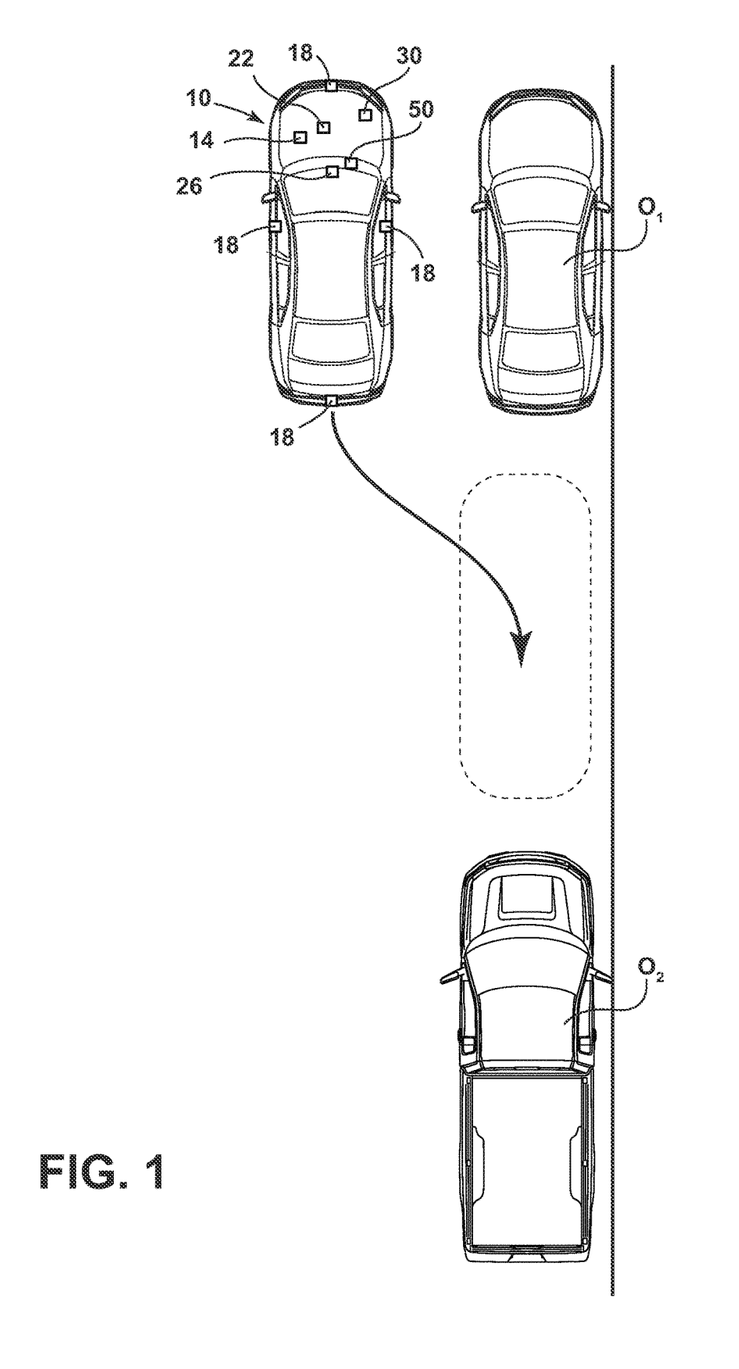
FIG. 1 is a schematic depiction of a vehicle in an exemplary parking scenario.

For purposes of description herein, the terms "upper," "lower," "right," "left," "rear," "front," "vertical," "horizontal," "interior," "exterior," and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction, or that it only extends in such direction, or on such a plane, without other directional components or deviations, unless otherwise specified.

Referring to FIGS. 1-4, reference numeral 10 generally designates a vehicle having a parking assist system 14. The vehicle 10 may include one or more proximity sensors 18 configured to sense a first distance $D_1$ to a first obstacle $O_1$. An audio sensor 22 is configured to sense an ambient sound within the vehicle 10. An environmental sensor 26 is configured to detect environmental conditions outside of the vehicle 10. A speed limiting controller 30 is configured to process data from the plurality of proximity sensors 18, the audio sensor 22, and the environmental sensor 26 and control the vehicle 10 based on the sensed conditions.

Referring now to FIG. 1, the vehicle 10 (e.g., a car, truck, or sports utility vehicle) is shown in an exemplary scenario where the vehicle 10 is parallel parking into a parking space. In this example, the vehicle 10 is conducting a reversing maneuver into the parking space and should avoid a collision with the first object $O_1$ (e.g., a car) and a second object $O_2$ (e.g., a car). In such a parking scenario, a driver of the vehicle 10 needs to pay attention to the location of the corners of the vehicle 10, traffic passing by, the speed of the vehicle 10, the orientation of the vehicle 10 within the parking space, the environmental conditions around the vehicle 10 and any potentially distracting conditions within the vehicle 10 (e.g., children and/or pets). Such a parking scenario may lead to a heavy cognitive load within the driver, potentially leading to a distraction induced collision.

Figure 2:
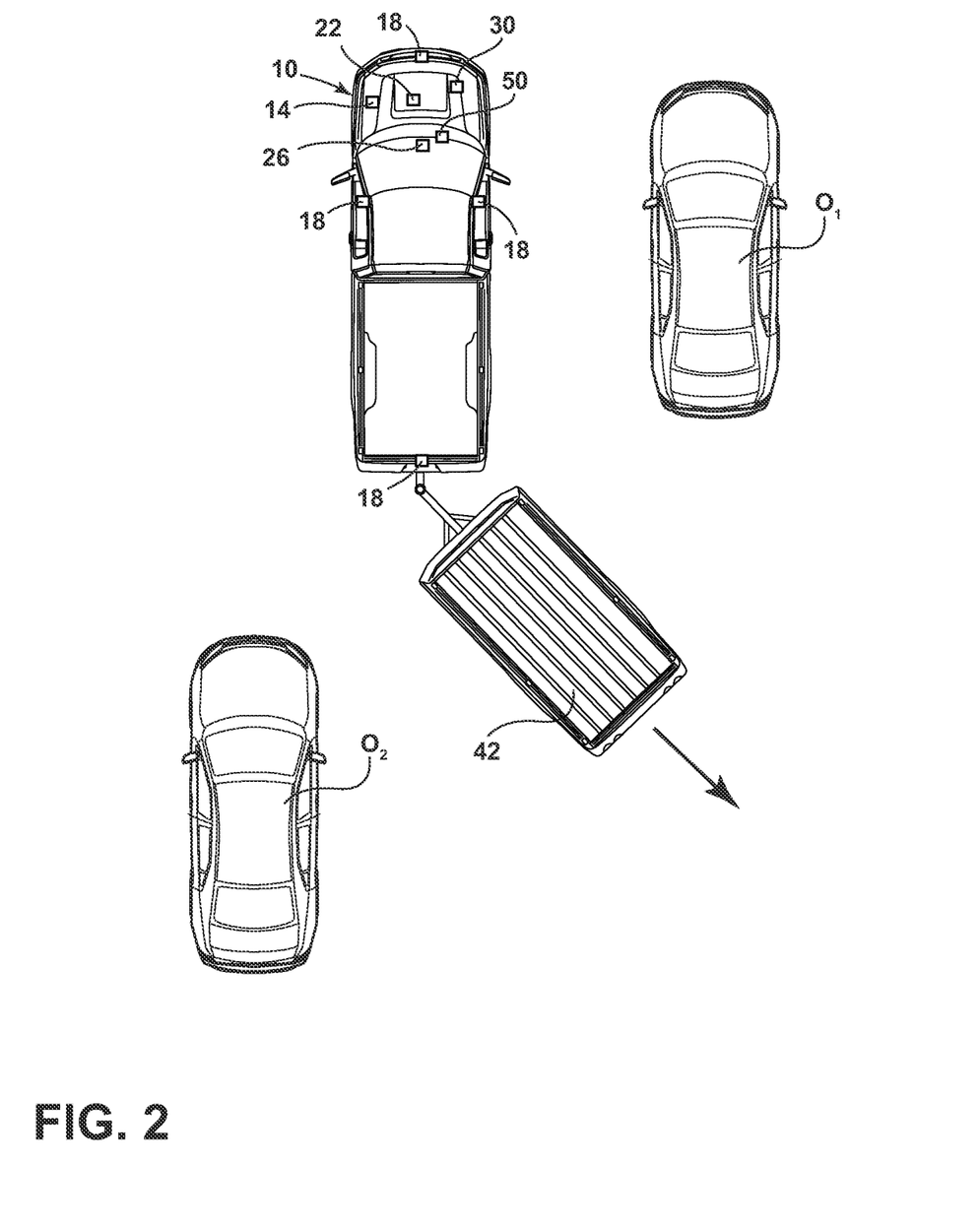
FIG. 2 is a schematic depiction of the vehicle and a trailer in an exemplary reversing scenario between obstacles.

Referring now to FIG. 2, the vehicle 10 is depicted as a truck towing a trailer 42. In the depicted example, the driver is backing the vehicle 10 and trailer 42 between the first and second obstacles $O_1$, $O_2$. In such a reversing scenario, the driver of the vehicle 10 must pay attention to all of the same distractions listed above in connection with parking, in addition to the motion of trailer 42 relative to the vehicle 10 leading to an even greater cognitive load on the driver. The reversing and/or parking of the vehicle 10 may be assisted using the system 14, which is generally configured, among other actions, to limit the speed of the vehicle 10 using the speed limiting controller 30 in various ways while moving the vehicle 10. The speed limiting controller 30 of the parking assist system 14 may also be utilized in situations where the vehicle 10 is towing or pushing the trailer 42 or other towed implement.

Referring now to FIGS. 1 and 2, the one or more proximity sensors 18 may be ultrasonic sensors, radar sensors, vision sensors (e.g., a camera or imager), LIDAR sensors, vehicle-to-vehicle communication sensors, combinations thereof or other sensors configured to detect the first and second obstacles $O_1$, $O_2$. The proximity sensors 18 may be configured to not only determine the first distance $D_1$ to the first obstacle $O_1$ and a second distance $D_2$ to the second obstacle $O_2$, but may also determine the locations of the first and second obstacles $O_1$, $O_2$ relative to the vehicle 10. It will be understood that the proximity sensors 18 are capable of detecting the presence and distance of more than two obstacles (e.g., three, four or greater than five). The proximity sensors 18 may output a variety of signals indicative of the locations and distances of the obstacles $O_1$, $O_2$ to the parking assist system 14 and the speed limiting controller 30. The audio sensor 22 may be positioned within a cabin of the vehicle 10 and configured to sense an ambient volume of noise within the vehicle 10. The audio sensor 22 may be configured as a microphone, audio sensing board, or other electronic device capable of sensing sound. Additionally, the audio sensor 22 may be configured to sense the location of the sound within the vehicle 10 (e.g., a back seat area, a trunk space, a front passenger area) or sense sound external to the vehicle 10. The environmental sensor 26 is configured to gather environmental data external to the vehicle 10. The environmental sensor 26 may include a camera (e.g., capable of sensing rain, snow, fog, hail, sleet), a capacitive sensor configured to detect the presence of moisture on the vehicle 10, a networked device configured to gather local and/or regional meteorological data through the internet, a general weather sensor or other devices capable of sensing the environmental conditions external to the vehicle 10. Further, the driver of the vehicle 10 may optionally input or confirm data about the weather conditions external to the vehicle 10 or road conditions. The vehicle 10 also includes a brake system 50 capable of slowing the vehicle 10 through actuation of one or more vehicle brakes. The brake system 50 is in electrical communication with at least one of the speed limiting controller 30 and the parking assist system 14 and may be actuated independent of intervention by the driver.

During reversing, the cognitive load, or the total amount of mental effort being used in the driver's working memory, may be higher than under normal driving circumstances due to a variety of factors such as the presence and location of collision hazards (e.g., the first and second obstacles $O_1$, $O_2$), ambient noise within a cabin of the vehicle 10, environmental conditions exterior to the vehicle 10 (e.g., weather), as well as a number of other factors. If the cognitive load of the driver is particularly heavy, the driver may fail to properly account for the movement of the vehicle 10, the speed of the vehicle 10, the location of the first and second obstacles $O_1$, $O_2$, or other tasks associated with operating the vehicle 10, which may lead to a collision. Accordingly, systems, such as the parking assist system 14, can include the ability within the speed limiting controller 30 to limit the speed of the vehicle 10 by establishing a speed limit or a reference speed that the vehicle 10 may not move faster than during the reversing or backing. It will be understood that although described herein as a separate dedicated controller, the speed limiting controller 30 may be embodied as a tangible machine readable code, algorithm, program, and/or operating mode of another shared controller present on the vehicle 10 (e.g., anti-lock braking system controller, parking aid module, vehicle controller area network bus, or electronic control unit) without departing from the scope of the disclosure. The speed limit may be originally generated based on a variety of factors such as an angle between the trailer 42 and the vehicle 10, stability of the vehicle 10 (e.g., as measured by yaw rate sensors), a mass of the vehicle 10 and/or the trailer 42, a grade of a road the vehicle 10 and/or trailer 42 is positioned on, parking space location, road grade of the parking space and/or other factors. It will also be understood that the speed limit may not be generated by the speed limiting controller 30, but generated by another controller or module of the parking assist system 14 or vehicle 10, and provided to the speed limiting controller 30, without departing from the spirit of this disclosure.

The speed limiting controller 30 can be configured for speed limiting by the incorporation of a proportional-integral-derivative ("PID") controller to monitor the difference between the vehicle speed and the speed limit (such difference being designated a speed error). The speed of the vehicle 10 may be measured through wheel count encoders of the brake system 50, GPS tracking, or other conventional methods of measuring the speed of the vehicle 10. In the event the vehicle speed is greater than the speed limit established by the speed limiting controller 30, the speed limiting controller may issue a brake torque request that will be sent to the brake system 50. The brake system 50 in turn applies the brakes appropriately, which alters the vehicle speed and reduces the speed error (i.e. lowering the speed of the vehicle 10). In alternative embodiments, the speed limiting controller 30 may reduce the output of a powertrain of the vehicle 10 separately, or in conjunction with, the brake torque request to slow the vehicle 10 to the speed limit. In some embodiments, the magnitude of the speed error may dictate the magnitude of the brake torque request and whether the speed limiting controller 30 issues the brake torque request with or without the reduction in powertrain output. The speed limiting controller 30 may take a variety of factors into account when issuing the brake torque request and/or the powertrain reduction such as road grade, powertrain output, the speed error and/or the speed limit, and/or the estimated cognitive load of the driver. In the event the vehicle speed is less than the speed limit, no brake torque request is issued by the speed limiting controller 30. For the purposes of speed limiting within a system such as system 14, the desired response is a system that quickly limits the vehicle speed to the speed limit with very little overshoot.

Figure 3:
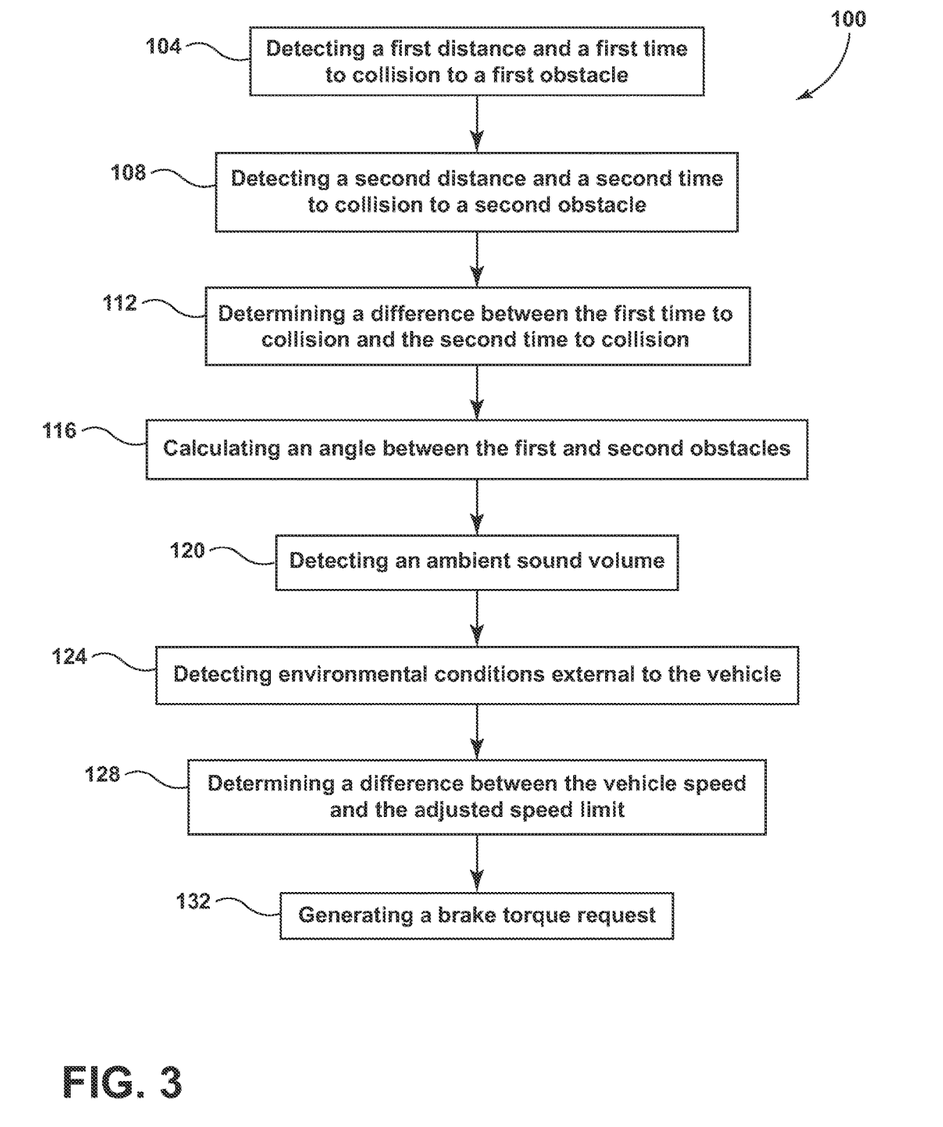
FIG. 3 is a schematic depiction of an exemplary method, according to one embodiment.

Referring now to FIG. 3, depicted is an exemplary method 100 by which the speed limiting controller 30 may alter the speed limit of the vehicle 10 based on factors which increase the cognitive load of the driver. As explained above, the cognitive load of the driver during a reversing or parking procedure may be heavy leading to a high potential of collision between the vehicle 10 and its surroundings (e.g., the first and second obstacles $O_1$, $O_2$). Accordingly, the method 100 examines a variety of potential distractions which may increase the cognitive load of the driver and reduces the speed limit accordingly. The method 100 may include steps 104, 108, 112, 116, 120, 124, 128 and 132, as shown.

Figure 4:
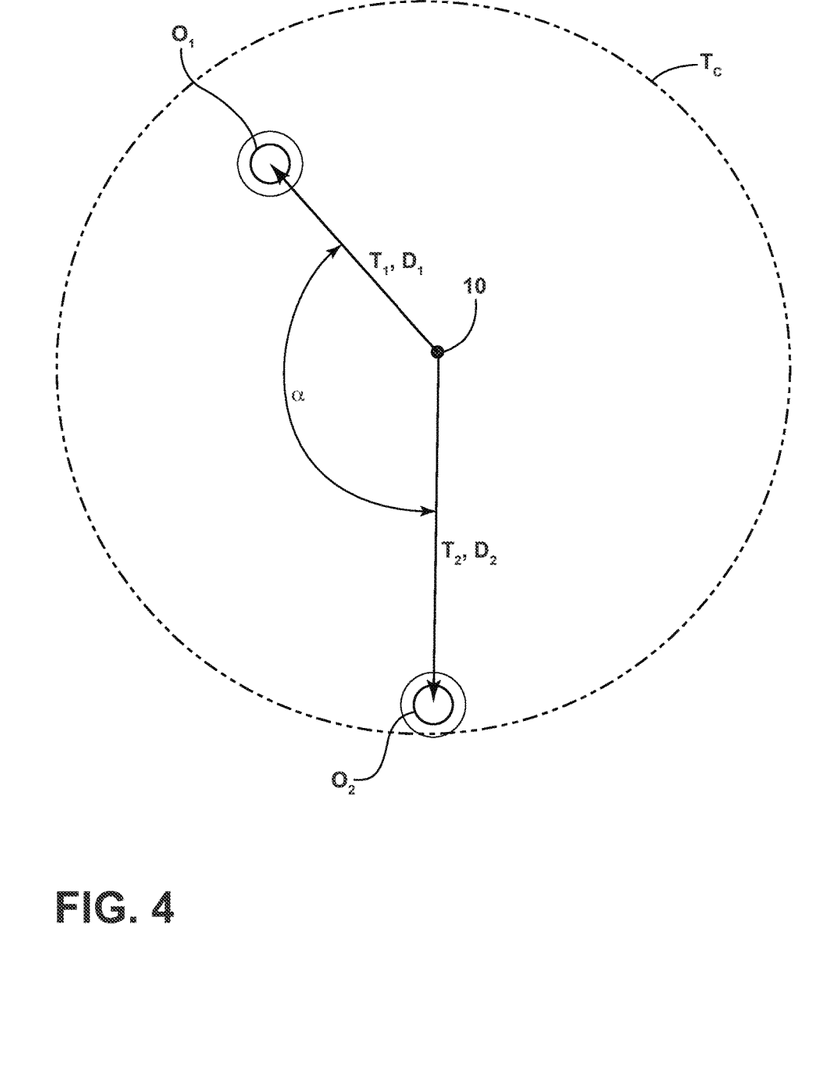
FIG. 4 is a diagrammatic view of one embodiment of a parking assist system of the vehicle of FIG. 1.

Referring now to FIGS. 3 and 4, step 104 of detecting the first distance $D_1$ and a first time to collision $T_1$ to the first obstacle $O_1$ and step 108 of detecting the second distance $D_2$ and a second time to collision $T_2$ to the second obstacle $O_2$ are performed using both the proximity sensors 18 and the speed limiting controller 30. The proximity sensors 18 transmit data about the detected relative distance of the first and second obstacles $O_1$, $O_2$ to the speed limiting controller 30 which may in turn calculate the first and second times to collision $T_1$, $T_2$. It will be understood that a separate controller or module (e.g., parking aid module, electronic control unit) may calculate the first and second times to collision $T_1$, $T_2$ and provide them to the speed limiting controller 30 without departing from the scope of this disclosure. If the speed limiting controller 30 detects the presence of more than one obstacle, step 112 of determining a difference between the first time to collision $T_1$ and the second time to collision $T_2$ is performed. In circumstances where the driver must keep track of the first and second obstacles $O_1$, $O_2$, the relative time to collision of each of the first and second obstacles $O_1$, $O_2$ with the vehicle 10 may become important. For example, if the first time to collision $T_1$ is much shorter than the second time to collision $T_2$, the driver may prioritize the first obstacle $O_1$ over the second obstacle $O_2$, thereby decreasing the cognitive load of the driver. A small value for the difference between the first time to collision $T_1$ and the second time to collision $T_2$ may be caused by at least two circumstances. In a first circumstance, a small difference between the first time to collision $T_1$ and the second time to collision $T_2$ may indicate that the first and second obstacles $O_1$, $O_2$ will collide with the vehicle 10 close in time and that the driver needs to pay attention to both obstacles simultaneously thereby increasing the cognitive load of the driver. In a second circumstance, the first and second obstacles $O_1$, $O_2$ may both have a small time to collision less than a critical time to collision $T_C$ which is predetermined and tunable (e.g., 400 milliseconds, 500 milliseconds, 600 milliseconds) indicating that both obstacles $O_1$, $O_2$ may pose an immediate threat to the vehicle 10.

If the difference between the first time to collision $T_1$ and the second time to collision $T_2$ is less than a predetermined tunable value (e.g., 400 milliseconds, 500 milliseconds, 600 milliseconds) then step 116 of calculating an angle $\alpha$ between the first and second obstacles $O_1$, $O_2$ is performed. In various embodiments, the angle $\alpha$ may be measured in a ground plane, or in the same plane as the vehicle 10. Measuring the angle $\alpha$ between the first and second obstacles $O_1$, $O_2$ may help in the estimation of the cognitive load of the driver as an indicator of the severity with which the driver must alter their field of view (i.e. must move their head) in order to observe both the first and second obstacles $O_1$, $O_2$. The greater the angle $\alpha$, the farther the driver generally must move their head back and forth to keep track of the first and second obstacles $O_1$, $O_2$ thereby increasing their cognitive load. If the angle $\alpha$ is greater than a predetermined tunable value (e.g., 60°, 75°, 90°, or other angle indicative of the driver's field of vision) in addition to the difference between the first time to collision $T_1$ and the second time to collision $T_2$ being greater than the predetermined tunable value, the speed limiting controller 30 may reduce the speed limit by a predetermined amount (e.g., 10%, 15%, 20%).

Referring again to FIG. 3, the speed limiting controller 30 may also account for an ambient sound volume in the cabin of the vehicle 10. Sounds can serve as a distraction to drivers and increase their cognitive load, more so with loud (e.g., greater than 70 dB) sounds. Additionally, human drivers are physiologically predisposed to prioritize certain critical sounds (e.g., a baby crying, sounds associated with danger, human voice) over other tasks at hand (e.g., driving the vehicle 10). Accordingly, lowering the speed limit of the vehicle 10 when a potentially distracting noise is present may be advantageous. Accordingly, when the audio sensor 22 detects an ambient sound volume greater than a predetermined tunable value (e.g., greater than 50 dB, greater than 60 dB, greater than 70 dB, greater than 80 dB, greater than 85 dB, greater than 90 dB, or greater than 100 dB) or when the audio sensor 22 detects a critical sound, the audio sensor 22 may output audio data or a signal to the speed limiting controller 30 such that the speed limit may be reduced by the speed limiting controller 30 by a predetermined amount (e.g., 10%, 15%, 20%). The audio sensor 22 may simply output a binary signal to the speed limiting controller 30 indicating a loud ambient volume, or the speed limiting controller 30 may be configured to receive a dynamic signal and proportionally reduce the speed limit based on the readings from the audio sensor 22.

The speed limiting controller 30 may also be in electrical communication with the environmental sensor 26 such that the speed limiting controller 30 may also take into consideration environmental conditions external to the vehicle 10 in assessing whether or not to reduce the speed limit in step 124. Environmental conditions may increase the cognitive load of the driver due to changes in visibility around the vehicle 10, handling conditions due to wet or frozen ground, and the likelihood of other driver's mistakes. As such, the speed limiting controller 30 may receive data from the environmental sensor 26 indicative of the environmental conditions external to the vehicle 10 and reduce the speed limit of the vehicle 10 accordingly. In various embodiments, the speed limiting controller 30 may reduce the speed limit by a predetermined tunable amount (e.g., 5%, 10%, 12%, 15%, 20%) for conditions affecting handling of the vehicle 10 (e.g., snow or ice present on the ground leading to slippery conditions) and reduce the speed limit by an additional amount (e.g., 5%, 10%, 12%, 15%, 20%) for conditions affecting the driver's visibility. In various embodiments, the reduction of the speed limit based on environmental conditions may be scalable, or proportional, to the severity of the conditions (e.g., dense fog vs. light fog, snowing vs. white out, black ice vs. light snow).

Once the speed limiting controller 30 has taken into account the potential distractions that may increase the cognitive load of the driver and reduced the speed limit of the vehicle 10 accordingly, the speed limiting controller 30 performs step 128 of determining a difference between the vehicle speed and the speed limit. The speed limiting controller 30 compiles the reductions in the speed limit to determine an adjusted speed limit. If the speed of the vehicle 10 is lower than the adjusted speed limit, the speed limiting controller 30 may take no action. If the speed limiting controller 30 determines that the speed of the vehicle 10 is greater than the adjusted speed limit, step 132 of generating a brake torque request is performed. The brake torque request may be based at least in part on the magnitude of the difference between the adjusted speed limit and the vehicle speed, angle between the trailer 42 and the vehicle 10, stability of the vehicle 10 (e.g., as measured by yaw rate sensors), a mass of the vehicle 10 and/or the trailer 42, a grade of a road the vehicle 10 and/or trailer 42 is positioned on, parking space location, road grade of the parking space and/or other factors. The brake torque request is sent to the brake system 50 to slow the vehicle 10.

It will be understood that although the present disclosure was described in connection with reversing and/or parking the vehicle 10 and/or trailer 42, the disclosure may equally be applied to forward motion and/or maneuvers of the vehicle 10 and/or trailer 42 without departing from the scope of this disclosure. Additionally, it will be understood that any and all of the tunable values explained in this disclosure may be tunable or predetermined based on a variety of factors. For example, certain values may be chosen to provide the driver with a greater amount of time before the speed limiting controller 30 or parking assist system 14 intervenes, or values may be chosen to decrease the time before the speed limiting controller 30 or parking assist system 14 intervenes, which may limit the abruptness of action and require less action by the driver. Further, it will be understood that the speed of the vehicle 10 may be reduced additionally or alternatively to the reduction of the speed limit when the speed limiting controller 30 or parking assist system 14 intervene.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A parking assist system for a vehicle, comprising:
   a speed limiting controller configured to set a speed limit for the vehicle during a maneuver;
   an audio sensor configured to sense a location of a noise within the vehicle, wherein the speed limiting controller is configured to proportionally reduce the speed limit based on the sensing of the noise exceeding a predetermined decibel level and based on the location of the noise relative to a driver; and
   a networked device configured to gather meteorological data, wherein the speed limiting controller is configured to proportionally reduce the speed limit based on the meteorological data collected by the networked device.

2. The parking assist system of claim 1, further comprising:
   an environmental sensor configured to determine environmental conditions exterior to the vehicle, wherein the speed limiting controller is configured lower the speed limit based at least in part on the environmental conditions exterior to the vehicle.

3. The parking assist system of claim 1, further comprising:
   one or more proximity sensors configured to detect a first distance to a first obstacle and a second distance to a second obstacle, wherein the speed limiting controller is configured to calculate an angle between the first and second obstacles.

4. The parking assist system of claim 3, wherein the speed limiting controller is configured to calculate a difference in a time to collision between the first and the second obstacles.

5. The parking assist system of claim 3, wherein the speed limiting controller is configured to reduce the speed limit of the vehicle if the angle exceeds a predetermined angle.

6. The parking assist system of claim 1, wherein the speed limiting controller is configured to reduce a speed of the vehicle by issuing a brake torque request to a brake system.

7. A vehicle parking assist system, comprising:
   a speed limiting controller configured to set a speed limit for a vehicle during a maneuver; and
   an audio sensor configured to sense a location of a noise within an interior of the vehicle, wherein the speed limiting controller is configured to receive a dynamic signal from the audio sensor and proportionally reduce the speed limit based on the sensing of the noise exceeding a predetermined level and based on the location of the noise relative to a driver.

8. The vehicle parking assist system of claim 7, wherein the speed limiting controller is configured to reduce the speed limit a first predetermined amount based on external conditions affecting handling of the vehicle.

9. The vehicle parking assist system of claim 8, wherein the speed limiting controller is configured to reduce the speed limit a second predetermined amount based on external conditions affecting visibility.

10. The vehicle parking assist system of claim 7, wherein the speed limiting controller is configured to reduce the speed limit based on the sensing of a critical sound.

11. The vehicle parking assist system of claim 7, further comprising:
a capacitive sensor configured to sense a presence of moisture on an exterior of the vehicle.

12. The vehicle parking assist system of claim 7, further comprising:
a networked device configured to gather meteorological data, wherein the speed limiting controller is configured to reduce the speed limit based on the meteorological data.

13. The vehicle parking assist system of claim 7, further comprising:
an environmental sensor including a camera configured to sense weather conditions external to the vehicle.

14. A method for assisting in parking a vehicle, comprising the steps of:
sensing a noise within an interior of a vehicle using an audio sensor;
sensing a location of the noise using the audio sensor; and
generating a brake torque request using a speed limiting controller configured to proportionally reduce a speed limit based on a volume of the noise and the location of the noise proximate a driver.

15. The method for assisting in parking a vehicle of claim 14, wherein the speed limiting controller is configured to reduce the speed limit based on the sensing of a critical sound.

16. The method for assisting in parking a vehicle of claim 14, wherein the audio sensor is a microphone positioned within the interior of the vehicle.

17. The method for assisting in parking a vehicle of claim 14, further comprising the step of:
sensing environmental conditions exterior to the vehicle using a camera configured to sense weather conditions and a capacitive sensor to sense moisture.

18. The method for assisting in parking a vehicle of claim 14, further comprising the step of:
sensing environmental conditions exterior to the vehicle using a networked device configured to gather meteorological data.

19. The method for assisting in parking a vehicle of claim 14, wherein the speed limiting controller is configured to reduce the speed limit a first predetermined amount based on external conditions affecting handling of the vehicle.

20. The method for assisting in parking a vehicle of claim 19, wherein the speed limiting controller is configured to reduce the speed limit a second predetermined amount based on external conditions affecting visibility.

* * * * *